US008194811B2

(12) United States Patent
Song et al.

(10) Patent No.: US 8,194,811 B2
(45) Date of Patent: Jun. 5, 2012

(54) CLOCK REPEATER AND PHASE-ERROR CORRECTING CIRCUIT

(75) Inventors: Hongjiang Song, Mesa, AZ (US); Yan Song, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1274 days.

(21) Appl. No.: 11/610,010

(22) Filed: Dec. 13, 2006

(65) Prior Publication Data

US 2008/0144760 A1    Jun. 19, 2008

(51) Int. Cl.
*H04L 7/00* (2006.01)

(52) U.S. Cl. ........ 375/355; 375/354; 375/359; 375/371; 375/375; 375/376

(58) Field of Classification Search .......... 375/130, 375/135–136, 145–147, 219–222, 242, 259, 375/295, 316, 346, 359, 370–371, 150, 375, 375/293, 294, 327, 339, 340, 342, 349, 354, 375/355, 362, 373, 376
See application file for complete search history.

(56) References Cited

U.S. PATENT DOCUMENTS

| | | | |
|---|---|---|---|
| 6,275,555 B1 | 8/2001 | Song | |
| 7,221,924 B2 * | 5/2007 | Zheng et al. | 455/307 |
| 7,288,971 B1 * | 10/2007 | Plasterer et al. | 326/127 |
| 7,804,926 B2 * | 9/2010 | Sanduleanu | 375/375 |
| 7,984,093 B1 * | 7/2011 | Tu et al. | 708/819 |
| 2006/0056357 A1 * | 3/2006 | Payne et al. | 370/334 |
| 2006/0197611 A1 * | 9/2006 | Yan | 331/16 |
| 2006/0211398 A1 * | 9/2006 | Wolf | 455/323 |
| 2006/0281429 A1 * | 12/2006 | Kishi et al. | 455/313 |
| 2007/0270115 A1 * | 11/2007 | Kravets | 455/283 |
| 2008/0209296 A1 * | 8/2008 | Crandford et al. | 714/747 |
| 2009/0097605 A1 * | 4/2009 | Farjad-Rad | 375/373 |
| 2009/0196387 A1 * | 8/2009 | McCune, Jr. | 375/355 |

* cited by examiner

*Primary Examiner* — Hirdepal Singh
(74) *Attorney, Agent, or Firm* — Schwegman, Lundberg & Woessner, P.A.

(57) ABSTRACT

Embodiments of a clock repeater and phase-error correcting circuit are generally described herein. Other embodiments may be described and claimed. In some embodiments, a clock repeater and phase-error correcting circuit may include a polyphase network having a non-symmetrical frequency response selected to reduce static phase error from a multi-phase clock signal, and an output buffer to buffer and to amplify the phase-corrected multi-phase clock signal.

24 Claims, 4 Drawing Sheets

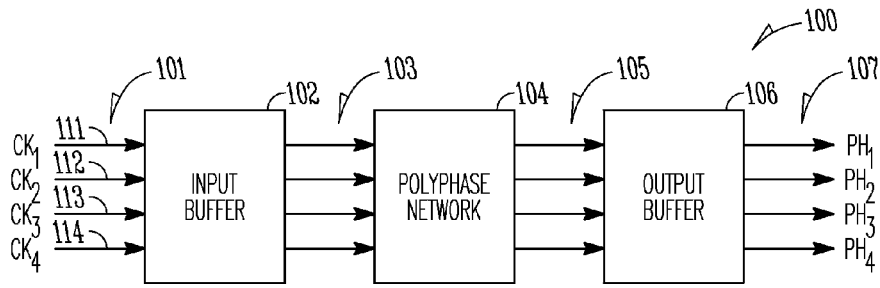
FIG. 1
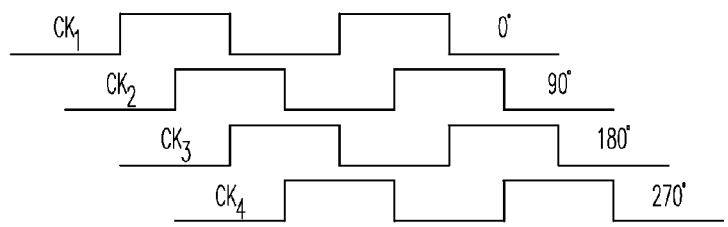
FIG. 2
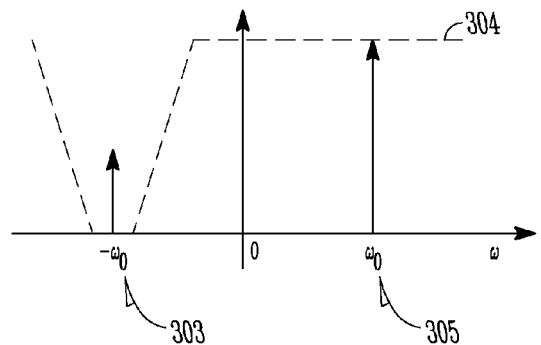
FIG. 3A
FIG. 3B

DATA RECOVERY CIRCUIT

CLOCK REPEATER AND PHASE-ERROR CORRECTING CIRCUIT

TECHNICAL FIELD

Some embodiments of the present invention pertain to data recovery circuits. Some embodiments of the present invention relate to multi-phase clock-recovery circuits.

BACKGROUND

Multi-phase reference clock signals, such as four-phase reference clocks, are used in many processing systems to sample signals. In some high-speed input/output (I/O) data recovery circuit (DRC) applications, reference clock signals are used to regenerate receiver sampling clock signals to track the phase of a received data stream. Non-idealities present in these reference clock signals, such as static phase error, duty cycle error, and/or jitter, resulting from link timing margin degradation may result in degraded I/O bit-error-rate (BER).

Thus, there are general needs for methods and circuits that correct and/or reduce the non-idealities present in multi-phase reference clock signals. There are also needs for data recovery circuits with reduced BER.

BRIEF DESCRIPTION OF THE DRAWINGS

FIG. 1 is a block diagram of a clock repeater and phase-error correcting circuit in accordance with some embodiments of the present invention;

FIG. 2 illustrates an ideal four-phase clock signal;

FIG. 3A mathematically illustrates the components of a non-ideal four-phase clock signal;

FIG. 3B illustrates the spectral components of a non-ideal four-phase clock signal;

DETAILED DESCRIPTION

Figure 4:
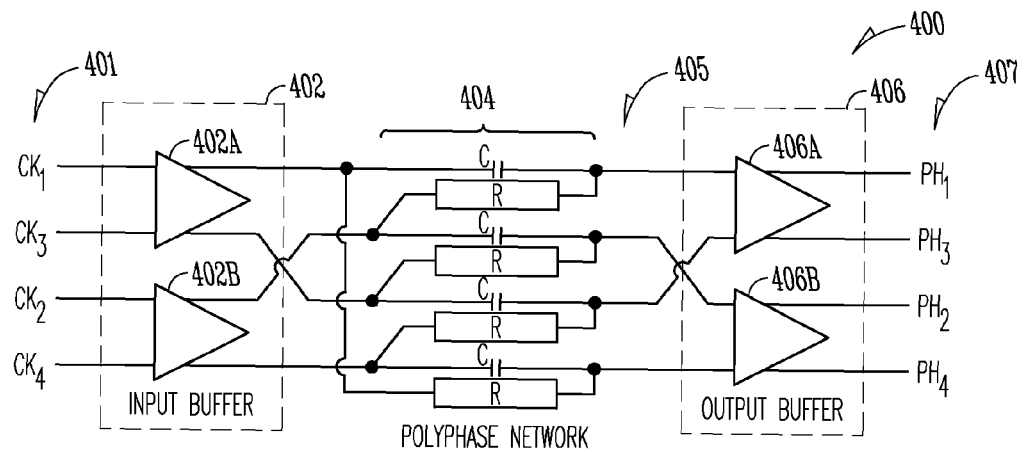
FIG. 4 illustrates a clock repeater and phase-error correcting circuit in accordance with some embodiments of the present invention.

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

FIG. 1 is a block diagram of a clock repeater and phase-error correcting circuit in accordance with some embodiments of the present invention. Clock repeater and phase-error correcting circuit 100 may reduce phase error present in multi-phase clock signal 101 providing phase-corrected multi-phase clock signal 107. In these embodiments, clock repeater and phase-error correcting circuit 100 may comprise input buffer 102, polyphase network 104, and output buffer 106. Input buffer 102 may amplify multi-phase clock signal 101 and reduce common-mode phase error from components of multi-phase clock signal 101. Input buffer 102 may provide output multi-phase clock signal 103 to the polyphase network 104. Polyphase network 104 may comprise passive circuitry having a non-symmetrical frequency response selected to reduce static phase error from multi-phase clock signal 101 and may provide phase-corrected multi-phase clock signal 105 to output buffer 106. Output buffer 106 may buffer and amplify phase-corrected multi-phase clock signal 105 to provide buffered and amplified phase-corrected multi-phase clock signal 107. In some embodiments, polyphase network 104 may have a non-symmetrical frequency response selected to substantially remove, reject, and/or filter out static phase error present in multi-phase clock signal 101. Static phase error may comprise signal components at an image frequency. For example, when multi-phase clock signal 101 has a clock-signal frequency of $\omega_0$, the image frequency is at frequency $-\omega_0$. This is described in more detail below.

Through the reduction and/or removal of the image signal, phase-spacing errors that may be present in multi-phase clock signal 101 may be corrected allowing the components of buffered and amplified phase-corrected multi-phase clock signal 107 to be provided at a predetermined phase separation, such as ninety-degrees. Clock repeater and phase-error correcting circuit 100 may be used to reduce phase errors in various high-speed I/O circuit applications including high-speed data recovery applications in which four-phase local reference clocks are used to regenerate receiver sampling clocks. Examples of these embodiments are described in more detail below.

In some embodiments, multi-phase clock signal 101 may comprise a four-phase reference clock signal having first, second, third and fourth component signals 111, 112, 113 and 114 separated by approximately ninety degrees in phase. In these embodiments, first component signal 111 may comprise a zero-degree component signal, second component signal 112 may comprise a ninety-degree component signal, third component signal 113 may comprise a one-hundred eighty degree component signal, and fourth component signal 114 may comprise a two-hundred seventy degree component signal.

FIG. 2 illustrates an ideal four-phase clock signal. Ideal four-phase clock signal 201 is shown as having ideal square wave component signals without the presence of other frequencies and non-idealities, such as static phase error, duty cycle error, and/or jitter, which may be present in multi-phase clock signal 101 (FIG. 1).

FIG. 3A mathematically illustrates the components of a non-ideal four-phase clock signal. FIG. 3B illustrates the spectral components of a non-ideal four-phase clock signal. As illustrated in FIGS. 3A and 3B, the components of multi-phase clock signal 301 may include ideal four-phase clock signal component 305 at clock-signal frequency $\omega_0$, and static phase-error component 303 at image frequency $-\omega_0$. Transfer function 304 illustrates an example of a desired transfer function for clock repeater and phase-error correcting circuit 100 (FIG. 1), although other transfer functions may also be suitable.

In some embodiments, multi-phase clock signal 301 may correspond to multi-phase clock signal 101 (FIG. 1). In some embodiments, clock-signal frequency $\omega_0$ may be approximately 2.5 GHz, while in some other embodiments, clock-signal frequency $\omega_0$ may be about 5 GHz, although clock-signal frequency $\omega_0$ may be selected to be almost any frequency between 10 MHz and 20 GHz.

FIG. 4 illustrates a clock repeater and phase-error correcting circuit in accordance with some embodiments of the present invention. Clock repeater and phase-error correcting circuit 400 may comprise input buffer 402, polyphase network 404, and output buffer 406. Clock repeater and phase-error correcting circuit 400 may be suitable for use as clock repeater and phase-error correcting circuit 100 (FIG. 1). In these embodiments, input buffer 402 may correspond to input buffer 102 (FIG. 1), polyphase network 404 may correspond to polyphase network 104 (FIG. 1), and output buffer 406 may correspond to output buffer 106 (FIG. 1).

Input buffer 402 may comprise differential buffer circuits 402A and 402B to amplify and reduce common-mode phase error from differential components of multi-phase clock signal 401. Output buffer 406 may comprise differential buffer circuits 406A and 406B to buffer and to amplify differential components of phase-corrected multi-phase clock signal 405.

Differential buffer circuits 402A, 402B, 406A, and 406B may comprise almost any type of differential buffer circuit. In some embodiments, differential buffer circuits 402A and 402B may comprise self-biased symmetrical load input buffer circuits, and differential buffer circuits 406A and 406B may comprise self-biased symmetrical load output buffer circuits. Examples of these embodiments are described in more detail below.

As illustrated in FIG. 4, polyphase network 404 may comprise an RC passive network of resistive elements (R) and capacitive elements (C) having an RC constant selected to correspond to substantially the clock-signal frequency $\omega_0$. In these embodiments, RC may be set to approximately coo (i.e., $\omega_0=1/(RC)$), although the scope of the invention is not limited in this respect.

Figure 5A:
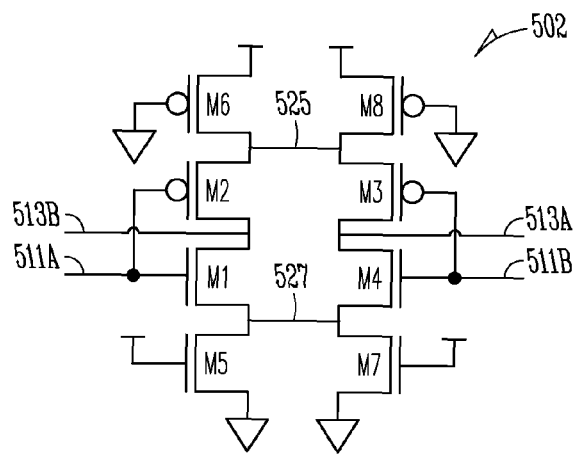
FIG. 5A illustrates a self-biased symmetrical load input buffer circuit in accordance with some embodiments of the present invention.

FIG. 5A illustrates a self-biased symmetrical load input buffer circuit in accordance with some embodiments of the present invention. Self-biased symmetrical load input buffer circuit 502 may be suitable for use as differential buffer circuit 402A (FIG. 4) and/or differential buffer circuit 402B (FIG. 4). When self-biased symmetrical load input buffer circuit 502 is used for differential buffer circuit 402A (FIG. 4), differential inputs 511A and 511B may receive differential clock signals Ck1 and Ck3 and provide differential output signals 513A and 513B to polyphase network 404 (FIG. 4). When self-biased symmetrical load input buffer circuit 502 is used for differential buffer circuit 402B (FIG. 4), differential inputs 511A and 511B may receive differential clock signals Ck2 and Ck4 and provide differential output signals 513A and 513B to polyphase network 404 (FIG. 4).

Figure 5B:
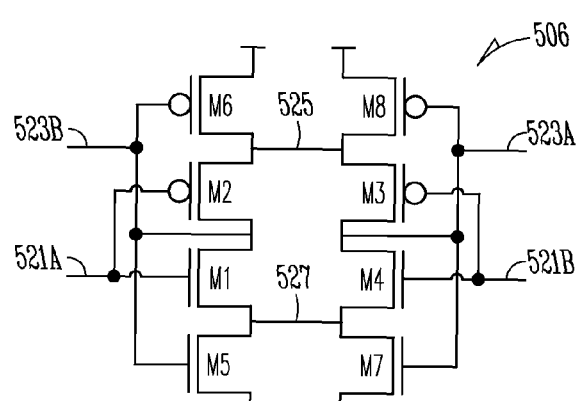
FIG. 5B illustrates a self-biased symmetrical load output buffer circuit in accordance with some embodiments of the present invention.

FIG. 5B illustrates a self-biased symmetrical load output buffer circuit in accordance with some embodiments of the present invention. Self-biased symmetrical load output buffer circuit 506 may be suitable for use as differential buffer circuit 406A (FIG. 4) and/or differential buffer circuit 406B (FIG. 4). When self-biased symmetrical load output buffer circuit 506 is used for differential buffer circuit 406A (FIG. 4), differential inputs 521A and 521B may receive differential signals from polyphase network 404 (FIG. 4) and provide differential clock signals ph1 and ph3 at differential output ports 523A and 523B. When self-biased symmetrical load input buffer circuit 506 is used for differential buffer circuit 406B (FIG. 4), differential inputs 521A and 521B may receive differential signals from polyphase network 404 (FIG. 4) and provide differential clock signals ph2 and ph4 at differential output ports 523A and 523B.

In some embodiments, self-biased symmetrical load input buffer circuit 502 (FIG. 5A) and/or self-biased symmetrical load output buffer circuit 506 (FIG. 5B) may comprise a symmetric differential complimentary metal-oxide semiconductor (SDCMOS) structure. In these embodiments, two complementary metal-oxide semiconductor (CMOS) transistor pairs (M1, M2, M3, M4) are used as the input devices, which extend the input signal to full swing. An additional two CMOS transistor pairs (M5, M6, M7, and M8) are used for either current biases or loads. The gates of the bias/load branches may be coupled together as illustrated. In these embodiments, circuits 502 and 506 are symmetric at both left-to-right and top-to-bottom directions. Three feedback loops are provided in the circuit structure, including a left loop by transistor M1, M2, M5, and M6, a right loop by transistor M3, M4, M7, and M8 and a common mode loop by transistors M5, M6, M7, and M8.

In self-biased symmetrical load input buffer circuit 502 (FIG. 5A), the gates of transistors M6 and M8 may be coupled to ground (or $V_{ss}$) and the gates of transistors M5 and M7 may be coupled to a supply voltage (e.g., $V_{cc}$) as illustrated. On the other hand, in self-biased symmetrical load output buffer circuit 506 (FIG. 5B), the gates of transistors M5, M6, M7 and M8 may be coupled to differential outputs 523B and 523A as illustrated.

In operation, input signals generate current through transistors M6 and M8, which join at node 525. The input signals also generate current through transistors M5 and M7, which join at node 527. This configuration allows input buffer circuit 502 (FIG. 5A) and output buffer circuit 506 (FIG. 5B) to be dynamically self-biased. Furthermore, this configuration may provide higher bias current around the cross point to achieve approximately zero DC bias, high speed switching, and a "soft landing" (e.g., substantially avoiding noise and glitches in the signal). These properties may help make input buffer circuit 502 (FIG. 5A) and output buffer circuit 506 (FIG. 5B) more robust for various applications (e.g., large power supply range, rail-to-rail signal swings, large transistor size range, etc.,) and scalable for different manufacture process technologies.

In some embodiments, input buffer circuit 502 (FIG. 5A) and output buffer circuit 506 (FIG. 5B) may be fabricated using CMOS technology, although the scope of the invention is not limited in this respect. In these embodiments, output buffer circuit 506 (FIG. 5B) may provide output signals at differential output ports 523A and 523B at a CMOS voltage level, although the scope of the invention is not limited in this respect.

In some CMOS embodiments, for some peripheral component interconnect (PCI) express applications, when input buffer circuit 502 (FIG. 5A) is used for differential buffer circuits 402A and 402B, and when output buffer circuit 506 (FIG. 5B) is used for differential buffer circuits 406A and 406B, clock repeater and phase-error correcting circuit 400 (FIG. 4) may achieve a 10× or more phase-error reduction when the static phase error of multi-phase clock signal 401 (FIG. 4) is as great as 30 picoseconds (ps). In these PCI-express embodiments, the clock frequency may be about 2.5 GHz, although the scope of the invention is not limited in this respect.

Figure 6A:
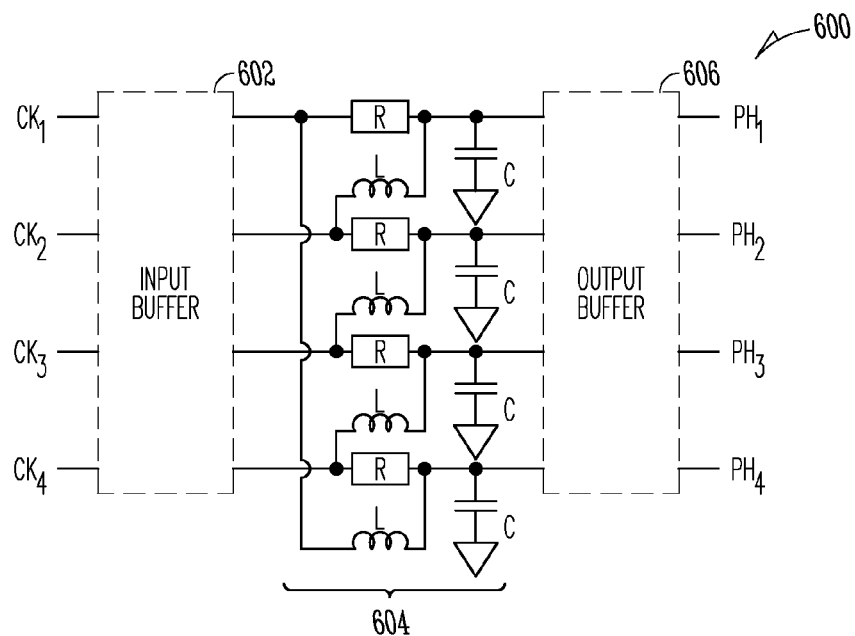
FIG. 6A illustrates a clock repeater and phase-error correcting circuit in accordance with some embodiments of the present invention.

FIG. 6A illustrates a clock repeater and phase-error correcting circuit in accordance with some embodiments of the present invention. Clock repeater and phase-error correcting circuit 600 may comprise input buffer 602, polyphase network 604, and output buffer 606. Clock repeater and phase-error correcting circuit 600 may be suitable for use as clock repeater and phase-error correcting circuit 100 (FIG. 1). In these embodiments, input buffer 602 may correspond to input buffer 102 (FIG. 1), polyphase network 604 may correspond to polyphase network 104 (FIG. 1), and output buffer 606 may correspond to output buffer 106 (FIG. 1).

In these embodiments, polyphase network 604 comprises an LRC passive network comprising a network of resistive elements (R), inductive elements (L) and capacitive elements (C) selected to enhance clock-signal frequency $\omega_0$ and to reduce image frequency $-\omega_0$ that may be present in multi-phase clock signal 101. These embodiments of the present invention, illustrated in FIG. 6A, may provide for separate selectability of the signal and image frequency as well as enhanced gain at the signal frequency. These embodiments may be attractive for higher-frequency applications in which lower-value inductors may be used to reduce layout area.

Figure 6B:
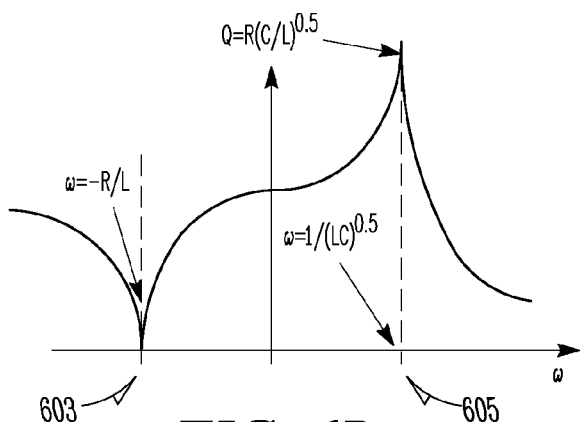
FIG. 6B illustrates a frequency response of a polyphase network in accordance with some embodiments of the present invention.

FIG. 6B illustrates a frequency response of polyphase network 604 (FIG. 6A) in accordance with some embodiments of the present invention. In these embodiments, reduced frequency ($\omega$) 603 may be selected to be at or near image frequency ($-\omega_0$) 303, and enhanced frequency ($\omega$) 605 may be selected to be at or near clock-signal frequency $\omega_0$, although the scope of the invention is not limited in this respect. As illustrated in FIG. 6B, reduced frequency ($\omega$) 603 may be selected to be approximately $-R/L$ and enhanced frequency ($\omega$) 605 may be selected to be approximately $1/(LC)^{0.5}$, although the scope of the invention is not limited in respect. In these embodiments, the Q of LRC passive network 604 may be approximately $R(C/L)^{0.5}$, although the scope of the invention is not limited in this respect.

Figure 7:
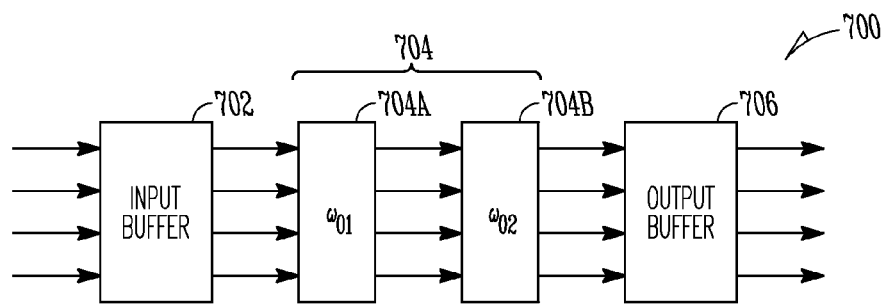
FIG. 7 illustrates a clock repeater and phase-error correcting circuit in accordance with some embodiments of the present invention.

FIG. 7 illustrates a clock repeater and phase-error correcting circuit in accordance with some embodiments of the present invention. Clock repeater and phase-error correcting circuit 700 may comprise input buffer 702, polyphase network 704, and output buffer 706. Clock repeater and phase-error correcting circuit 700 may be suitable for use as clock repeater and phase-error correcting circuit 100 (FIG. 1). In these embodiments, input buffer 702 may correspond to input buffer 102 (FIG. 1), polyphase network 704 may correspond to polyphase network 104 (FIG. 1), and output buffer 706 may correspond to output buffer 106 (FIG. 1).

In these embodiments, polyphase network 704 may comprise first and second polyphase networks 704A and 704B. First polyphase network 704A may be configured to reduce frequency components of multi-phase clock signal 101 (FIG. 1) between approximately 10 and 20 percent below an image frequency (illustrated in FIG. 7 as $\omega_{01}$). Second polyphase network 704B may be configured to reduce frequency components of multi-phase clock signal 101 (FIG. 1) between approximately 10 and 20 percent above the image frequency (illustrated in FIG. 7 as $\omega_{02}$). In these embodiments, the frequency response of first polyphase network 704A may have a notch approximate 10 to 20 percent below the image frequency, and the frequency response of second polyphase network 704B may have a notch approximate 10 to 20 percent above image frequency $-\omega_0$. The embodiments of clock repeater and phase-error correcting circuit 700 may help compensate for process variations. The placement of filters 704A and 704B may be interchanged.

Figure 8:
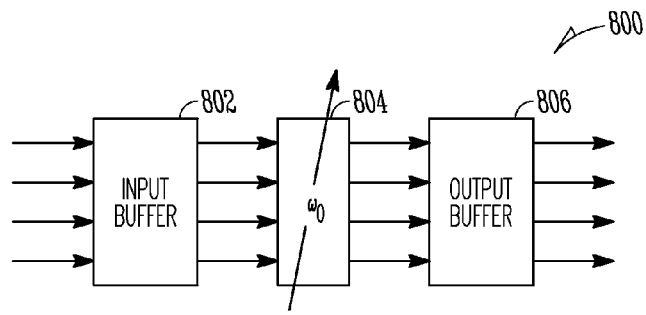
FIG. 8 illustrates a clock repeater and phase-error correcting circuit in accordance with some embodiments of the present invention.

FIG. 8 illustrates a clock repeater and phase-error correcting circuit in accordance with some embodiments of the present invention. Clock repeater and phase-error correcting circuit 800 may comprise input buffer 802, polyphase network 804, and output buffer 806. Clock repeater and phase-error correcting circuit 800 may be suitable for use as clock repeater and phase-error correcting circuit 100 (FIG. 1). In these embodiments, input buffer 802 may correspond to input buffer 102 (FIG. 1), polyphase network 804 may correspond to polyphase network 104 (FIG. 1), and output buffer 806 may correspond to output buffer 106 (FIG. 1). In these embodiments, polyphase network 804 may comprise a frequency-tunable polyphase network to allow adjustment of a notch frequency after fabrication. The adjustment may in part, compensate for process variations. In some embodiments, the tunable network may be realized using voltage-controllable resistors and/or voltage-controllable capacitor that may provide for continuous tuning, although the scope of the invention is not limited in this respect. In some other embodiments, resistor/inductor and/or capacitor banks may be provided for discrete tuning, although the scope of the invention is not limited in this respect.

Figure 9:
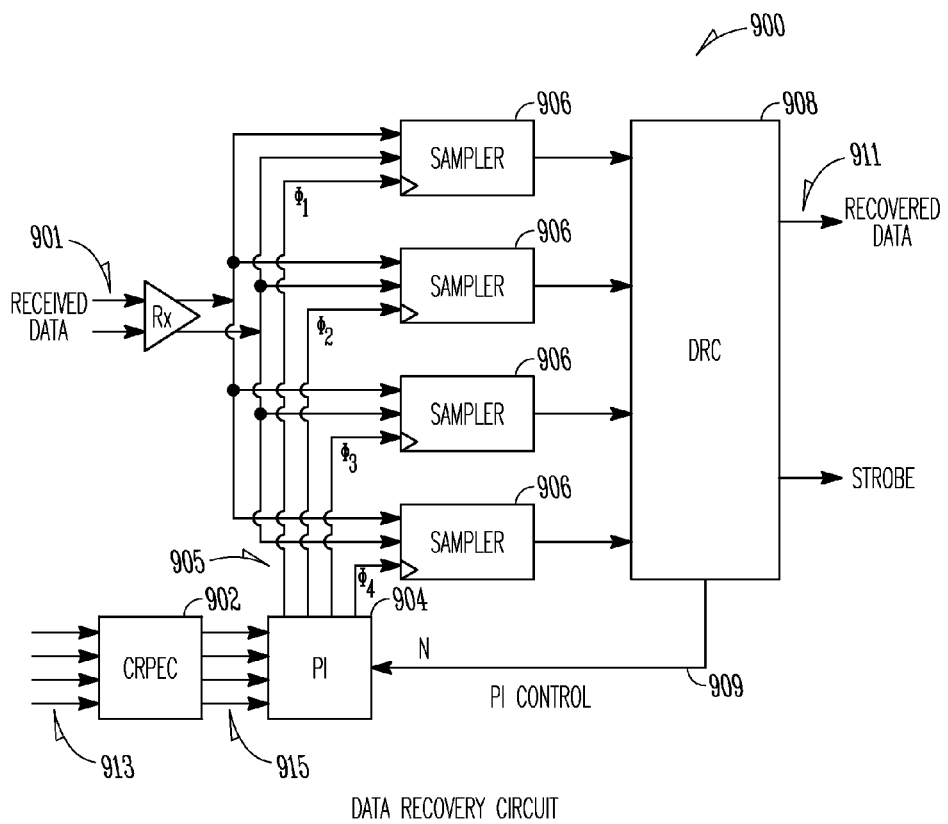
FIG. 9 illustrates a data recovery circuit in accordance with some embodiments of the present invention.

FIG. 9 illustrates a data recovery circuit in accordance with some embodiments of the present invention. Data recovery circuit 900 uses a multi-phase clock signal to recover data received from a channel. In these embodiments, received data 901 may be recovered by data recovery circuit 900 that generates recovered data 911. Received data 901 may be provided from a differential receiver, such as a differential receiver of a PCI-express transceiver although the scope of the invention is not limited in this respect. In these embodiments, data recovery circuit 900 may be part of a receiver. In some embodiments, received data 901 may be provided by circuit board traces from another circuit board or another integrated circuit.

Data recovery circuit 900 may include phase-interpolator (PI) 904 to generate four-phase sampling clock signals 905 (shown as ($\phi 1$, $\phi 2$, $\phi 3$, and $\phi 4$) to samplers 906 for use in sampling received data 901, which may comprise a received data stream. Data recovery circuitry (DRC) 908 provides phase-interpolation control signal 909 to phase-interpolator 904 as part of a DRC loop and generates recovered data 911. In this way, sampling clocks 905 may track the phase of received data 901. Recovered data 911 may be in serial form and may be provided to a serial-to-parallel converter. In some embodiments, clock repeater and phase-error correcting (CRPEC) circuit 902 may be provided before phase-interpolator 904 to regenerate reference clock signals 913 providing phase-corrected multi-phase clock signal 915. Reference clock signals 913 may be provided by a phase-locked-loop (PLL) of a receiver. In these embodiments, clock repeater and phase-error correcting circuit 100 (FIG. 1) may be suitable for use as clock repeater and phase-error correcting circuit 902, multi-phase clock signal 101 (FIG. 1) may correspond to reference clock signals 913, and phase-corrected multi-phase clock signal 107 (FIG. 1) may correspond to phase-corrected multi-phase clock signal 915.

In some other embodiments (not illustrated), when phase-interpolator 904 is positioned farther from samplers 906, clock repeater and phase-error correcting circuit 902 may be provided between phase-interpolator 904 and samplers 906. In these embodiments, clock repeater and phase-error correcting circuit 902 may be used to regenerate and remove static phase error from four-phase sampling clock signals 905.

Although data recovery circuit 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A clock repeater and phase-error correcting circuit comprising:
   a polyphase network to receive a multi-phase clock signal from an input buffer, the polyphase network having a non-symmetrical frequency response selected to reduce static phase error from the multi-phase clock signal to provide a phase-corrected multi-phase clock signal; and
   an output buffer to buffer and to amplify the phase-corrected multi-phase clock signal,
   wherein the non-symmetrical frequency response of the polyphase network is to reduce the static phase error by enhancing a signal level of a clock-signal frequency ($\omega_0$) of the multi-phase clock signal and by reducing a signal level of an image frequency ($-\omega_0$) of the clock-signal frequency present in the multi-phase clock signal without changing the clock-signal frequency ($\omega_0$) or the image frequency ($-\omega_0$),
   wherein the polyphase network is a passive network.

2. The circuit of claim 1 further comprising the input buffer to amplify and to reduce common-mode phase error from the multi-phase clock signal, the input buffer to provide an output multi-phase clock signal to the polyphase network,
   wherein the output buffer amplifies and buffers differential components of the phase-corrected multi-phase clock signal provided by the polyphase network.

3. The circuit of claim 2 wherein the input buffer comprises self-biased symmetrical load input buffer circuits, and
   wherein the output buffer comprises self-biased symmetrical load output buffer circuits.

4. The circuit of claim 3 wherein the output buffer amplifies the phase-corrected multi-phase clock signal to a complimentary metal-oxide semiconductor (CMOS) voltage level, and
   wherein the self-biased symmetrical load input and output buffer circuits comprise symmetric differential complimentary metal-oxide semiconductor (SDCMOS) structures.

5. The circuit of claim 2 wherein the polyphase network comprises a frequency-tunable polyphase network to allow adjustment of a notch frequency after fabrication, and
   wherein the adjustment at least in part compensates for process variations.

6. A clock repeater and phase-error correcting circuit comprising:
   a polyphase network having a non-symmetrical frequency response selected to reduce static phase error from a multi-phase clock signal to provide a phase-corrected multi-phase clock signal;
   an output buffer to buffer and to amplify the phase-corrected multi-phase clock signal; and
   an input buffer to amplify and to reduce common-mode phase error from the multi-phase clock signal, the input buffer to provide an output multi-phase clock signal to the polyphase network,
   wherein the output buffer amplifies and buffers differential components of the phase-corrected multi-phase clock signal provided by the polyphase network,
   wherein the input buffer comprises self-biased symmetrical load input buffer circuits,
   wherein the output buffer comprises self-biased symmetrical load output buffer circuits,
   wherein the multi-phase clock signal comprises a four-phase reference clock signal having first, second, third and fourth component signals separated by approximately ninety degrees in phase,
   wherein the input buffer comprises a first self-biased symmetrical load input buffer circuit to receive the first and third component signals of the multi-phase clock signal, and
   wherein the input buffer further comprises a second self-biased symmetrical load input buffer circuit to receive the second and fourth component signals of the multi-phase clock signal.

7. The circuit of claim 6 wherein the output buffer comprises a first self-biased symmetrical load output buffer circuit to receive first and third component signals of the multi-phase clock signal provided by the polyphase network, and
   wherein the output buffer further comprises a second self-biased symmetrical load output buffer circuit to receive second and fourth component signals of the multi-phase clock signal provided by the polyphase network.

8. The circuit of claim 6 wherein the multi-phase clock signal has a clock-signal frequency ($\omega_0$), and
   wherein the polyphase network comprises an RC passive network of resistive elements (R) and capacitive elements (C) having an RC constant selected to correspond to substantially the clock-signal frequency ($\omega_0$).

9. The circuit of claim 6 wherein the multi-phase clock signal has a clock-signal frequency ($\omega_0$), and
   wherein the polyphase network comprises an LRC passive network comprising a network of resistive elements (R), inductive elements (L) and capacitive elements (C) to enhance the clock-signal frequency ($\omega_0$) and selected to reduce an image frequency ($-\omega_0$) present in the multi-phase clock signal.

10. A clock repeater and phase-error correcting circuit comprising:
    a polyphase network having a non-symmetrical frequency response selected to reduce static phase error from a multi-phase clock signal to provide a phase-corrected multi-phase clock signal;
    an output buffer to buffer and to amplify the phase-corrected multi-phase clock signal; and
    an input buffer to amplify and to reduce common-mode phase error from the multi-phase clock signal, the input buffer to provide an output multi-phase clock signal to the polyphase network,
    wherein the output buffer amplifies and buffers differential components of the phase-corrected multi-phase clock signal provided by the polyphase network, wherein the polyphase network comprises a first and second polyphase networks, wherein the first polyphase network is configured to reduce frequency components of the multi-phase clock signal between approximately 10 and 20 percent below an image frequency, and wherein the second polyphase network is configured to reduce frequency components of the multi-phase clock signal between approximately 10 and 20 percent above the image frequency.

11. A data recovery circuit comprising:

a clock repeater and phase-error correcting circuit to reduce static phase error in a multi-phase clock signal and provide a phase-corrected multi-phase clock signal;

a phase-interpolator to generate sampling clock signals from the phase-corrected multi-phase clock signal and a phase-interpolation control signal;

a plurality of samplers to sample received data in response to the sampling clock signals; and data recovery circuitry to recover data from the sampled received data and provide the phase-interpolation control signal, wherein the clock repeater and phase-error correcting circuit comprises:

an input buffer to amplify and to reduce common-mode phase error from a multi-phase clock signal;

a polyphase network to receive a multi-phase clock signal from the input buffer, the polyphase network having a non-symmetrical frequency response selected to reduce static phase error from a multi-phase clock signal to provide a phase-corrected multi-phase clock signal; and an output buffer to buffer and to amplify the phase-corrected multi-phase clock signal, wherein the non-symmetrical frequency response of the polyphase network is to reduce the static phase error by enhancing a signal level of a clock-signal frequency ($\omega_0$) of the multi-phase clock signal and by reducing a signal level of an image frequency ($-\omega_0$) of the clock-signal frequency present in the multi-phase clock signal without changing the clock-signal frequency ($\omega_0$) or the image frequency ($-\omega_0$), and wherein the polyphase network is a passive network.

12. The data recovery circuit of claim 11 wherein the input buffer comprises a pair of self-biased symmetrical load input buffer circuits, wherein the output buffer comprises a pair of self-biased symmetrical load output buffer circuits to buffer and to amplify the phase-corrected multi-phase clock signal, and wherein the sampling clock signals are to track a phase of the received data.

13. The data recovery circuit of claim 12 wherein the self-biased symmetrical load input and output buffer circuits comprise a symmetric differential complimentary metal-oxide semiconductor (SDCMOS) structure.

14. The data recovery circuit of claim 13 wherein the polyphase network comprises an RC passive network of resistive elements (R) and capacitive elements (C) having an RC constant selected to correspond to substantially the clock-signal frequency.

15. The data recovery circuit of claim 13 wherein the polyphase network comprises an LRC passive network comprising a network of resistive elements (R), inductive elements (L) and capacitive elements (C) to enhance the clock-signal frequency ($\omega_0$) and selected to reduce the image frequency ($-\omega_0$) present in the multi-phase clock signal.

16. The data recovery circuit of claim 13 wherein the polyphase network comprises a frequency-tunable polyphase network to allow adjustment of a notch frequency after fabrication, and wherein the adjustment at least in part compensates for process variations.

17. A data recovery circuit comprising:

a clock repeater and phase-error correcting circuit to reduce static phase error in a multi-phase clock signal and provide a phase-corrected multi-phase clock signal;

a phase-interpolator to generate sampling clock signals from the phase-corrected multi-phase clock signal and a phase-interpolation control signal;

a plurality of samplers to sample received data in response to the sampling clock signals; and data recovery circuitry to recover data from the sampled received data and provide the phase-interpolation control signal, wherein the clock repeater and phase-error correcting circuit comprises:

an input buffer to amplify and to reduce common-mode phase error from a multi-phase clock signal;

a polyphase network having a non-symmetrical frequency response selected to reduce static phase error from a multi-phase clock signal to provide a phase-corrected multi-phase clock signal; and an output buffer to buffer and to amplify the phase-corrected multi-phase clock signal, wherein the non-symmetrical frequency response is to reduce the static phase error by enhancing a clock-signal frequency ($\omega_0$) of the multi-phase clock signal and by reducing an image frequency ($\omega_0$) of the clock-signal frequency present in the multi-phase clock signal, wherein the input buffer comprises a pair of self-biased symmetrical load input buffer circuits, wherein the output buffer comprises a pair of self-biased symmetrical load output buffer circuits to buffer and to amplify the phase-corrected multi-phase clock signal, wherein the sampling clock signals are to track a phase of the received data, wherein the self-biased symmetrical load input and output buffer circuits comprise a symmetric differential complimentary metal-oxide semiconductor (SDCMOS) structure, wherein the polyphase network comprises a first and second polyphase networks, wherein the first polyphase network is configured to reduce frequency components of the multi-phase clock signal between approximately 10 and 20 percent below the image frequency, and wherein the second polyphase network is configured to reduce frequency components of the multi-phase clock signal between approximately 10 and 20 percent above the image frequency.

18. A clock repeater and phase-error correcting circuit comprising:

an input buffer comprising a pair of self-biased symmetrical load input buffer circuits to amplify and to reduce common-mode phase error from a multi-phase clock signal;

a polyphase network to receive a multi-phase clock signal from the input buffer, the polyphase network having a non-symmetrical frequency response selected to reduce static phase error from the multi-phase clock signal to provide a phase-corrected multi-phase clock signal; and an output buffer comprising a pair of self-biased symmetrical load output buffer circuits to buffer and to amplify the phase-corrected multi-phase clock signal, wherein the non-symmetrical frequency response of the polyphase network is to reduce the static phase error by enhancing a signal level of a clock-signal frequency ($\omega_0$) of the multi-phase clock signal and by reducing a signal level of an image frequency ($-\omega_0$) of the clock-signal frequency present in the multi-phase clock signal without changing the clock-signal frequency ($\omega_0$) or the image frequency ($-\omega_0$), and wherein the polyphase network is a passive network.

19. The circuit of claim 18 wherein the self-biased symmetrical load input and output buffer circuits comprise a symmetric differential complimentary metal-oxide semiconductor (SDCMOS) structure.

20. The circuit of claim 19 wherein the multi-phase clock signal comprises a four-phase reference clock signal having first, second, third and fourth component signals separated by approximately ninety degrees.

21. The circuit of claim 20 wherein the polyphase network comprises an RC passive network of resistive elements (R) and capacitive elements (C) having an RC constant selected to correspond to substantially the clock-signal frequency.

22. The circuit of claim 20 wherein the polyphase network comprises an LRC passive network comprising a network of resistive elements (R), inductive elements (L) and capacitive elements (C) to enhance the clock-signal frequency ($\omega_0$) and selected to reduce the image frequency ($-\omega_0$) present in the multi-phase clock signal.

23. The circuit of claim 20 wherein the polyphase network comprises a frequency-tunable polyphase network to allow adjustment of a notch frequency after fabrication, and wherein the adjustment at least in part compensates for process variations.

24. A clock repeater and phase-error correcting circuit comprising:

an input buffer comprising a pair of self-biased symmetrical load input buffer circuits to amplify and to reduce common-mode phase error from a multi-phase clock signal;

a polyphase network having a non-symmetrical frequency response selected to reduce static phase error from the multi-phase clock signal to provide a phase-corrected multi-phase clock signal; and an output buffer comprising a pair of self-biased symmetrical load output buffer circuits to buffer and to amplify the phase-corrected multi-phase clock signal, wherein the non-symmetrical frequency response is to reduce the static phase error by enhancing a clock-signal frequency ($\omega_0$) of the multi-phase clock signal and by reducing an image frequency ($-\omega_0$) of the clock-signal frequency present in the multi-phase clock signal, wherein the self-biased symmetrical load input and output buffer circuits comprise a symmetric differential complimentary metal-oxide semiconductor (SDCMOS) structure, wherein the multi-phase clock signal comprises a four-phase reference clock signal having first, second, third and fourth component signals separated by approximately ninety degrees, wherein the polyphase network comprises a first and second polyphase networks, wherein the first polyphase network is configured to reduce frequency components of the multi-phase clock signal between approximately 10 and 20 percent below the image frequency, and wherein the second polyphase network is configured to reduce frequency components of the multi-phase clock signal between approximately 10 and 20 percent above the image frequency.

* * * * *

UNITED STATES PATENT AND TRADEMARK OFFICE
CERTIFICATE OF CORRECTION

PATENT NO. : 8,194,811 B2  
APPLICATION NO. : 11/610010  
DATED : June 5, 2012  
INVENTOR(S) : Song et al.

Page 1 of 1

It is certified that error appears in the above-identified patent and that said Letters Patent is hereby corrected as shown below:

In column 10, line 33 (Approx.), in Claim 17, after "image frequency", Delete "($\omega_0$)" and insert --($-\omega_O$)--, therefor Signed and Sealed this  
Ninth Day of October, 2012

David J. Kappos  
*Director of the United States Patent and Trademark Office*